(12) United States Patent
Jeng et al.

(10) Patent No.: US 10,877,573 B2
(45) Date of Patent: Dec. 29, 2020

(54) HANDHELD APPARATUS, CONTROL METHOD THEREOF OF PRESENTING MODE AND COMPUTER-READABLE RECORDING MEDIUM

(71) Applicant: HTC Corporation, Taoyuan (TW)

(72) Inventors: Shuo-Fang Jeng, Taoyuan (TW); Yu-Cheng Hung, Taoyuan (TW); Shih-Lung Lin, Taoyuan (TW); Kuan-Wei Li, Taoyuan (TW); Pei-Chun Tsai, Taoyuan (TW); Yu-Chu Lin, Taoyuan (TW); Ching-Yung Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/120,322

(22) Filed: Sep. 3, 2018

(65) Prior Publication Data
US 2019/0332191 A1 Oct. 31, 2019

Related U.S. Application Data

(60) Provisional application No. 62/663,212, filed on Apr. 26, 2018.

(51) Int. Cl.
*G06F 3/0346* (2013.01)
*G06F 3/041* (2006.01)
(Continued)

(52) U.S. Cl.
CPC ........ *G06F 3/0346* (2013.01); *G06F 3/03548* (2013.01); *G06F 3/041* (2013.01);
(Continued)

(58) Field of Classification Search
CPC .................................................. G06F 3/0346
See application file for complete search history.

(56) References Cited

U.S. PATENT DOCUMENTS

2013/0113731 A1* 5/2013 Yoo .......................... G06F 3/041
345/173
2013/0141464 A1* 6/2013 Hunt ..................... G06F 1/1626
345/659
(Continued)

FOREIGN PATENT DOCUMENTS

CN 103034423 4/2013
CN 103226396 7/2013
(Continued)

OTHER PUBLICATIONS

"Office Action of China Counterpart Application", dated Jul. 3, 2020, p. 1-p. 9.

*Primary Examiner* — Phi Hoang
(74) *Attorney, Agent, or Firm* — JCIPRNET (57) ABSTRACT

A handheld apparatus, a control method thereof of a presenting mode and a computer-readable recording medium are provided. The handheld apparatus includes at least one first sensor, a second sensor, a screen and a processor. The first sensor is disposed on the handheld apparatus. The second sensor detects orientation. The handheld apparatus has an auto-rotate screen function of automatically adjusting a presenting mode of the screen to a portrait mode or a landscape mode according to the orientation. The processor determines whether the handheld apparatus is in a hold state according to sensing data of the first sensor. In response to determining that the handheld apparatus is in the hold state, the processor locks the presenting mode according to the presenting mode currently performed by the handheld apparatus without adjusting the presenting mode according to the auto-rotate screen function. Accordingly, a convenient operation of the presenting mode is provided.

11 Claims, 7 Drawing Sheets

(51) Int. Cl.
  *G06F 3/0354* (2013.01)
  *G06F 3/0488* (2013.01)
(52) U.S. Cl.
  CPC ........ G06F 3/0414 (2013.01); G06F 3/04886 (2013.01); *G06F 2203/04105* (2013.01)

(56) References Cited

U.S. PATENT DOCUMENTS

| | | | |
|---|---|---|---|
| 2014/0152586 A1* | 6/2014 | Terunuma | G06F 3/0482 345/173 |
| 2014/0210708 A1* | 7/2014 | Simmons | G06F 3/01 345/156 |
| 2015/0138141 A1* | 5/2015 | Huang | G06F 1/1626 345/174 |
| 2016/0274622 A1* | 9/2016 | Braun | G06F 1/1626 |
| 2017/0185212 A1* | 6/2017 | Jeong | G06F 3/0412 |
| 2018/0039340 A1 | 2/2018 | Li | |
| 2018/0181257 A1* | 6/2018 | Wang | G06F 3/0488 |
| 2018/0260068 A1* | 9/2018 | Hiroi | G06F 1/163 |

FOREIGN PATENT DOCUMENTS

| | | |
|---|---|---|
| CN | 104345882 | 2/2015 |
| CN | 105511770 | 4/2016 |
| CN | 105739693 | 7/2016 |
| CN | 107273017 | 10/2017 |

\* cited by examiner

HANDHELD APPARATUS, CONTROL METHOD THEREOF OF PRESENTING MODE AND COMPUTER-READABLE RECORDING MEDIUM

CROSS-REFERENCE TO RELATED APPLICATION

This application claims the priority benefit of U.S. provisional application Ser. No. 62/663,212, filed on Apr. 26, 2018. The entirety of the above-mentioned patent application is hereby incorporated by reference herein and made a part of this specification.

BACKGROUND

Technical Field

The disclosure relates to a method of operating a handheld apparatus, and more particularly to a handheld apparatus, a control method thereof of a presenting mode, and a non-transitory computer-readable recording medium.

Related Art

In modern people's life, people can hardly be separated from handheld apparatuses such as mobile phones, tablet computers, handheld game consoles, and so on. A handheld apparatus can be used to play multimedia files, browse web pages, navigate, and games. Moreover, according to individual needs, a screen of the handheld apparatus may display in a portrait mode or a landscape mode. For example, the portrait mode is more suitable for inputting text, viewing documents, reading e-books or the like, while the landscape mode is more suitable for playing games, watching videos, viewing pictures or the like. In order to achieve more intelligent operation, the handheld apparatuses generally have an auto-rotate screen function which automatically adjusts the screen to the portrait mode or the landscape mode when the user changes an orientation of the handheld apparatuses. However, in some application scenarios, when the auto-rotate screen function is automatically activated in the handheld apparatus, a poor user experience may be caused. For example, at first, the user sits on the bed and uprightly holds the handheld apparatus, such that the screen automatically displays in the portrait mode. The user then lies down while still uprightly holding the handheld apparatus. However, the presenting mode of the screen may automatically and inappropriately switch to the landscape mode as the orientation of the handheld apparatus has changed.

SUMMARY

The disclosure provides a handheld apparatus, a control method thereof of a presenting mode, and a non-transitory computer-readable recording medium, providing more flexible operation so that a presenting mode of a screen can satisfy actual needs.

A control method of a presenting mode according to the disclosure is adapted for a handheld apparatus including a screen. The handheld apparatus has an auto-rotate screen function of automatically adjusting a presenting mode of the screen to a portrait mode or a landscape mode according to an orientation of the handheld apparatus. The control method includes the following steps. Whether the handheld apparatus is in a hold state is determined according to sensing data of at least one sensor disposed on the handheld apparatus. In response to the handheld apparatus being determined to be in the hold state, the handheld apparatus is locked to remain in the presenting mode according to the presenting mode currently performed by the handheld apparatus without adjusting the presenting mode according to the auto-rotate screen function.

In an embodiment of the disclosure, the following step is further included. In response to the handheld apparatus being not in the hold state, the presenting mode is adjusted to the portrait mode or the landscape mode according to the auto-rotate screen function.

In an embodiment of the disclosure, the following step is further included. In response to the handheld apparatus being in the hold state, the auto-rotate screen function is not activated.

In an embodiment of the disclosure, the following step is further included. In response to the presenting mode of the handheld apparatus being locked, whether the orientation of the handheld apparatus is in a predetermined state is detected, to switch the presenting mode currently performed by the handheld apparatus to another presenting mode.

In an embodiment of the disclosure, the step of determining whether the handheld apparatus is in the hold state includes the following steps. Whether the handheld apparatus is being contacted is determined according to the sensing data. In response to the handheld apparatus being contacted, it is determined that the handheld apparatus is in the hold state.

In an embodiment of the disclosure, the sensor is disposed on two opposite sides of the handheld apparatus, and the step of determining whether the handheld apparatus is in the hold state includes the following steps. Whether the two sides of the handheld apparatus are both being contacted is determined according to the sensing data. In response to the two sides of the handheld apparatus being contacted, it is determined that the handheld apparatus is in the hold state.

In an embodiment of the disclosure, the step of determining whether the handheld apparatus is in the hold state further includes the following step. Whether a total contact area or a total contact length of the handheld apparatus is greater than a threshold is determined according to the sensing data, to determine the handheld apparatus is in the hold state.

In an embodiment of the disclosure, the step of determining whether the handheld apparatus is in the hold state includes the following step. Whether a total contact area or a total contact length of the handheld apparatus on at least one of the two sides is greater than a threshold is determined according to the sensing data, to determine whether the handheld apparatus is in the hold state.

A handheld apparatus according to the disclosure includes at least one first sensor, a second sensor, a screen and a processor. The first sensor is disposed on a body of the handheld apparatus. The second sensor senses an orientation of the body. The handheld apparatus has an auto-rotate screen function of automatically adjusting a presenting mode of the screen to a portrait mode or a landscape mode according to the orientation of the body. The processor is coupled to the first sensor, the second sensor and the screen. The processor is configured to perform the following steps. The processor determines whether the handheld apparatus is in a hold state according to sensing data of the first sensor. In response to determining that the handheld apparatus is in the hold state, the processor locks the handheld apparatus to remain in the presenting mode according to the presenting mode currently performed by the handheld apparatus without adjusting the presenting mode according to the auto-rotate screen function.

In an embodiment of the disclosure, the processor is configured to perform the following steps. The processor determines the handheld apparatus is not in the hold state, and adjusts the presenting mode to the portrait mode or the landscape mode according to the auto-rotate screen function.

In an embodiment of the disclosure, the processor is configured to perform the following step. In response to the handheld apparatus is in the hold state, the processor does not activate the auto-rotate screen function.

In an embodiment of the disclosure, the first sensor is disposed on two opposite sides of the body, and the processor is configured to perform the following step. In response to the presenting mode of the handheld apparatus is locked, the processor detects whether the orientation of the body is in a predetermined state, to switch the presenting mode currently performed by the handheld apparatus to another presenting mode.

In an embodiment of the disclosure, the processor is configured to perform the following steps. The processor determines whether the body is being contacted according to the sensing data. In response to the body is being contacted, the processor determines the handheld apparatus is in the hold state.

In an embodiment of the disclosure, the first sensor is disposed on two opposite sides of the body, and the processor is configured to perform the following steps. The processor determines whether the two sides of the body are both being contacted according to the sensing data. In response to the two sides of the handheld apparatus are both contacted, the processor determines that the handheld apparatus is in the hold state.

In an embodiment of the disclosure, the processor is configured to perform the following step. The processor determines whether a total contact area or a total contact length of the body is greater than a threshold according to the sensing data, to determine the handheld apparatus is in the hold state.

In an embodiment of the disclosure, the processor is configured to perform the following step. The processor determines whether a total contact area or a total contact length of the handheld apparatus on at least one of the two sides is greater than a threshold according to the sensing data, to determine the handheld apparatus is in the hold state.

In an embodiment of the disclosure, the first sensor includes at least one of a capacitive sensor, a resistive sensor, a piezoelectric sensor, an electromagnetic sensor, an ultrasonic sensor, an infrared sensor, an optical sensor and a pressure sensor.

In an embodiment of the disclosure, the second sensor includes at least one of a G-sensor, a magnetic sensor and an accelerator.

A non-transitory computer-readable recording medium according to the disclosure records a code, the code being loaded onto a processor of a handheld apparatus including a screen to perform the following steps. Whether the handheld apparatus is in a hold state is determined according to sensing data of at least one sensor disposed on the handheld apparatus. In response to the handheld apparatus being determined to be in the hold state, the presenting mode is locked according to the presenting mode currently performed by the handheld apparatus without being adjusted according to the auto-rotate screen function.

Based on the above, the handheld apparatus, the control method of the presenting mode thereof and the non-transitory computer-readable recording medium according to the embodiment of the disclosure are configured such that the handheld apparatus remains in the hold state, and the presenting mode of the screen remains unchanged until the handheld apparatus is no longer in the hold state. Accordingly, more flexible operation can be provided and actual application scenarios can be satisfied.

To make the above features and advantages of the disclosure more comprehensible, examples accompanied with drawings are described in detail as follows.

DESCRIPTION OF THE EMBODIMENTS

Figure 1:
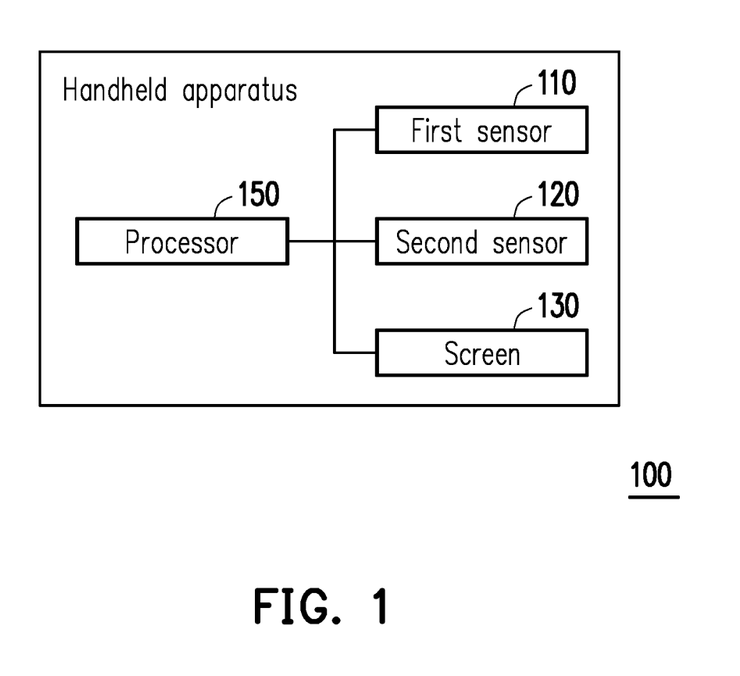
FIG. 1 is a block diagram of components of a handheld apparatus according to an embodiment of the disclosure.

FIG. 1 is a block diagram of components of a handheld apparatus 100 according to an embodiment of the disclosure. The handheld apparatus 100 includes, at least but not limited to, at least one first sensor 110, a second sensor 120, a screen 130, and a processor 150. The handheld apparatus 100 may be a mobile phone, a tablet computer, a digital camera, a handheld game console, a navigation machine, or a multimedia player.

Figure 2A:
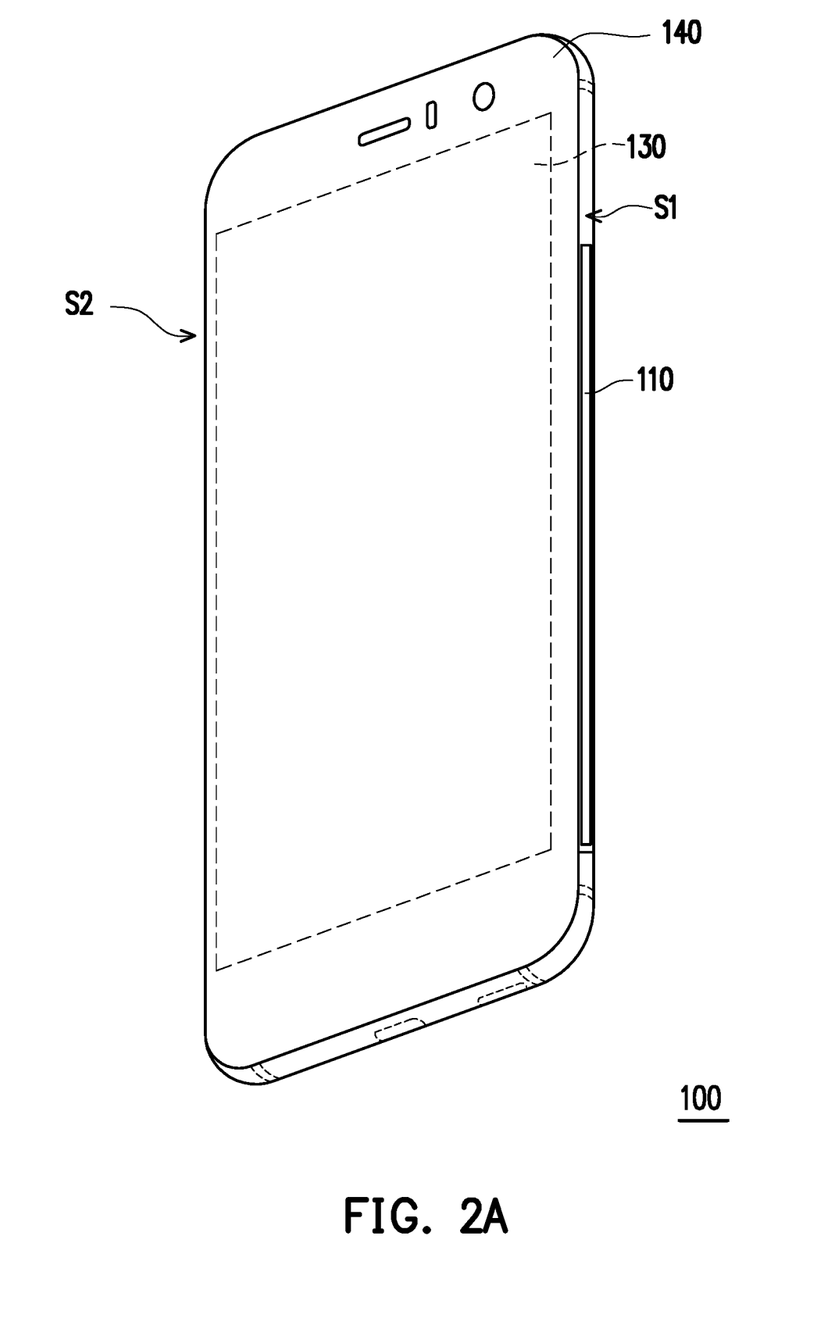
FIG. 2A and FIG. 2B are schematic diagrams of the handheld apparatus according to an embodiment of the disclosure.
Figure 2B:
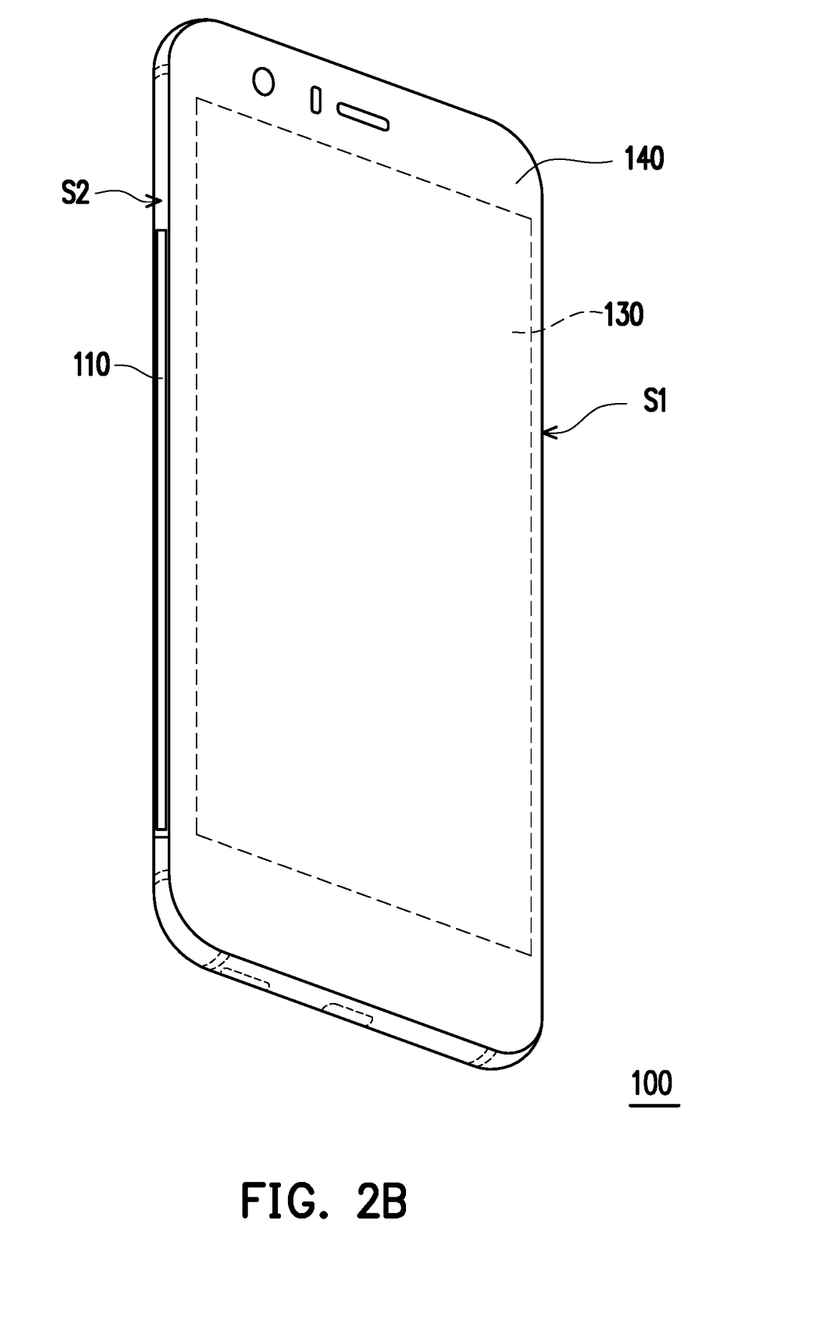

FIG. 2A and FIG. 2B are schematic diagrams of the handheld apparatus according to an embodiment of the disclosure. Referring to FIG. 1, FIG. 2A and FIG. 2B together, in the present embodiment, two first sensors 110 are respectively disposed on two sides S1 and S2 of a body 140 of the handheld apparatus 100. In the embodiment, one side S1 of the body 140 is opposite the other side S2, and the sides S1 and S2 are located on left and right sides of the body 140. The first sensor 110 may be a capacitive sensor, a resistive sensor, a piezoelectric sensor, an electromagnetic sensor, an ultrasonic sensor, an infrared sensor, an optical sensor, other type of pressure sensor, or a combination of the foregoing sensors. The first sensor 100 may detect the presence of an object (e.g., fingers, a gripper, etc.) placed on the sides S1 and S2 of the body 140 and generate raw data related to contact position, force or pressure.

It is to be noted that, the two first sensors 110 may cover all or part of the area on the sides S1 and S2 of the body 140, and each first sensor 110 may include one or more sensing elements disposed on one side S1/S2 of the body 140. Each first sensor 110 may also include one or more types of pressure sensors. The sensing elements may be arranged in a one-dimensional array from a top end to a bottom end along the sides S1 and S2, whereby a contact length on the side S1 or S2 contacted by the object (e.g., the fingers, the gripper, etc.) can be detected. Alternatively, the sensing elements may be arranged in a two-dimensional array from the top end to the bottom end along the sides S1 and S2, whereby the contact area on the side S1 or S2 contacted by the object can be detected. It is to be noted that, the shape and dimension formed by the aforesaid arranged sensing elements can be changed according to actual needs, and the embodiment of the disclosure is not limited thereto.

In addition, although FIG. 2A and FIG. 2B show a design in which the two first sensors 110 are disposed on the two sides S1 and S2, the number or position of the first sensor 110 may be changed depending on different design needs, and the disclosure is not limited thereto. For example, only one first sensor 110 may be disposed on one side S1 of the body 140, or two first sensors 110 may be disposed on each of the sides S1 and S2 of the body 140.

The second sensor 120 may be a G-sensor, a magnetic sensor, an accelerator, or other sensor that provides sensing data related to the orientation. In the present embodiment, in response to a movement of the handheld apparatus 100, the second sensor 120 generates a sensing signal (e.g., acceleration, angular velocity, direction, etc.) on different axes (e.g., x and y axes, three axes, etc.), thereby sensing the orientation (e.g., upright, horizontal, or other orientation, etc.) of the body 140 of the handheld apparatus 100.

The screen 130 may be a liquid crystal display (LCD), a light emitting diode (LED) display, an organic light emitting diode (OLED) display or other type of display. As shown in FIG. 2A and FIG. 2B, left and right sides of the screen 130 are close to the sides S1 and S2 of the body 140. In some embodiments, the screen 130 may be combined with a touch panel (including a touch sensor such as a resistive touch sensor, a capacitive touch sensor, an optical touch sensor, etc.) to provide display and touch functions.

The processor 150 is coupled to the first sensor 110, the second sensor 120 and the screen 130, and may be a central processing unit (CPU), a microcontroller, a programmable controller, an application-specific integrated circuit, other similar component, or a combination of the foregoing components. The function of the processor 150 may be implemented by an independent electronic apparatus or integrated circuit (IC), and the operation of the processor 150 may be implemented by software. In the present embodiment, the processor 150 is configured or programmed to perform later-described functions and steps.

To facilitate understanding of an operation process in the embodiment of the disclosure, a flow of control of a presenting mode of the screen according to the embodiment of the disclosure will be hereinafter explained in detail with reference to numerous examples. In the following, the method in the embodiment of the disclosure will be explained with reference to devices, components and modules in the handheld apparatus 100. The steps in this method may be varied according to actual situations and are not limited to those described herein.

Figure 3:
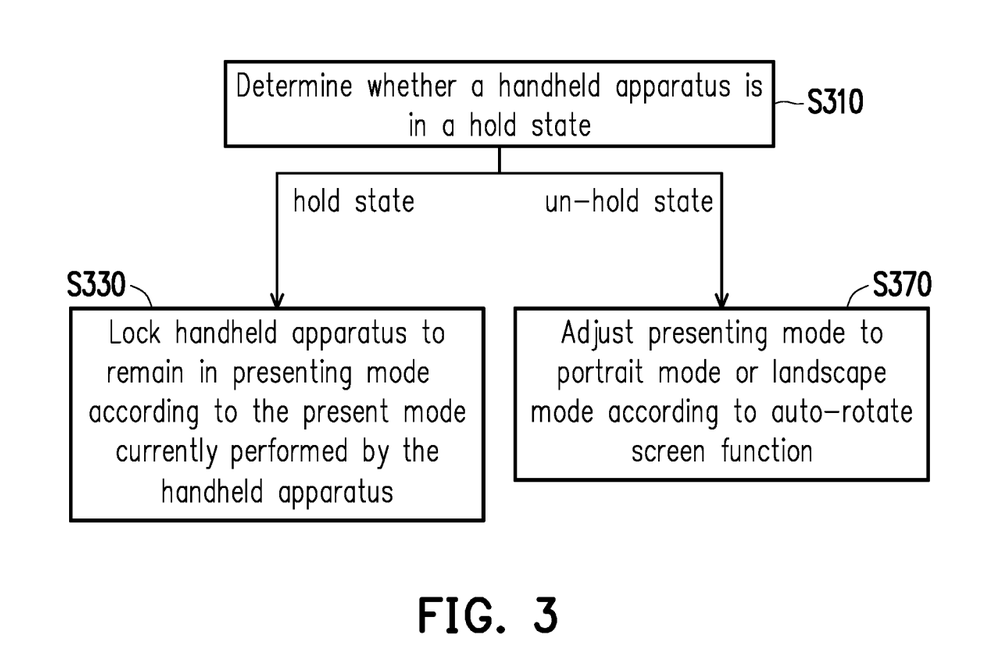
FIG. 3 is a flowchart of a control method of a presenting mode according to an embodiment of the disclosure.
Figure 4:
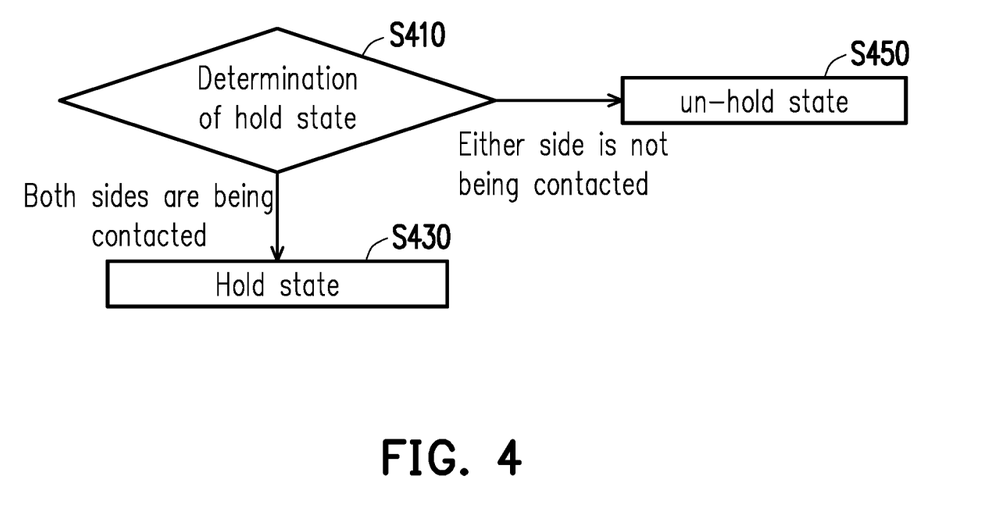
FIG. 4 is a flowchart of determining a hold state according to an embodiment of the disclosure.

FIG. 3 is a flowchart of a control method for a presenting mode according to an embodiment of the disclosure. Referring to FIG. 3, the processor 150 determines whether the handheld apparatus 100 is in a hold state according to the sensing data of the first sensor 110 on the corresponding sides S1 and S2 (step S310). Specifically, since the first sensor 110 is disposed on both sides S1 and S2 of the body 140 and a user usually contacts the sides S1 and S2 when holding the body 140 by hand, the sensing data (e.g., positions of contact points, the number of contact points, contact area/length, applied force, etc.) generated by the first sensor 110 disposed on the sides S1 and S2 contributes to the determination of the hold state. Referring to FIG. 4, which is a flowchart of determining the hold state, in the present embodiment, the processor 150 determines whether the handheld apparatus 100 is in the hold state according to the number of contact points on the sides S1 and S2 of the body 140. The processor 150 determines whether the sides S1 and S2 of the handheld apparatus 100 are both being contacted (i.e., whether the number of contact points is greater than zero). In the present embodiment, it is assumed that a general user contacts both sides S1 and S2 when holding the handheld apparatus 100 with one hand. For example, the user's thumb and/or palm may contact one side S1/S2, while at least one of the other fingers (i.e., index finger, middle finger, ring finger and little finger) of the same hand may contact the other side S2/S1. If contact points are detected on both sides S1 and S2, the processor 150 determines that the handheld apparatus 100 is in the hold state (step S430). If the first sensor 110 does not detect any contact point on any of the sides S1 and S2 of the body 140 (i.e., either side is not being contacted), the processor 150 determines that the handheld apparatus 100 is in a un-hold state (step S450).

Figure 5:
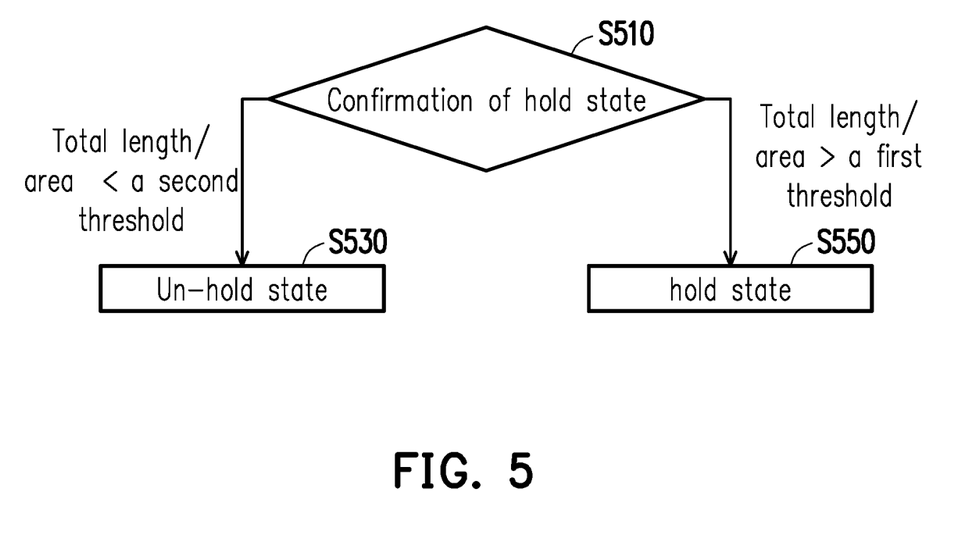
FIG. 5 is a flowchart of determining the hold state according to an embodiment of the disclosure.

Referring to FIG. 5, in an embodiment, if the sides S1 and S2 of the handheld apparatus 100 are both being contacted (i.e., the number of contact points is greater than zero), the processor 150 further determines whether a total contact area or a total contact length of the handheld apparatus 140 on at least one (or one) of the sides S1 and S2 is greater than a first threshold, to confirm whether the handheld apparatus 100 is in the hold state (step S510). If the total contact length/area of the handheld apparatus 140 on at least one of the sides S1 and S2 is greater than the first threshold, the processor 150 determines that the handheld apparatus 100 is in the hold state (step S550). For example, when the user's palm leans against one side S1 of the handheld apparatus 140, while the index finger, middle finger and ring finger of the same hand press the other side S2, the processor 150 determines whether the contact length/area on the side S1 corresponding to the palm is greater than the first threshold, or whether the total contact length/area (i.e., the sum of the contact length/area of three regions on the other side S2 contacted by the three fingers) on the other side S2 corresponding to the three fingers is greater than the first threshold. If determining that the total contact length/area on either side S1/S2 is greater than the first threshold, the processor 150 determines that the handheld apparatus 100 is in the hold state (step S550).

On the other hand, if the total contact length/area of the handheld apparatus 140 on at least one (or one) of the sides S1 and S2 is smaller than a second threshold, the processor 150 determines that the handheld apparatus 100 is in the un-hold state (step S530). For example, the handheld apparatus 140 may be lightly placed on the user's palm, and the palm may only slightly contact the sides S1 and S2 of the handheld apparatus 140. The processor 150 determines whether the total contact length/area on the side S1 or S2 with the palm is smaller than the second threshold. If determining that the total contact length/area on the sides S1 and S2 does not exceed the threshold, the processor 150 determines the handheld apparatus 100 is in the un-hold state (step S530). Since the user's force cannot be in a constant state, the first threshold is set to be greater than the second threshold, and there is an allowable value between the two thresholds. When it has been confirmed that the handheld apparatus 140 is in the hold state, it can be determined that the handheld apparatus 140 is in the un-hold state after it is determined that the total contact length/area is smaller than the second threshold. Alternatively, when it has been confirmed that the handheld apparatus 140 is in the un-hold state, it can be determined that the handheld apparatus 140 is in the hold state after it is determined that the total contact length/area is greater than the first threshold. Accordingly, the risk of erroneous determination is reduced.

However, the first threshold may be the same as the second threshold according to actual application needs, and the embodiment of the disclosure is not limited thereto.

It is to be noted that the contact area or the contact length is based on the shape of arrangement of the sensing elements of the first sensor 110, wherein the contact length can be detected by a one-dimensional shape, and the contact area can be detected by a two-dimensional shape. In addition, the processor 150 may perform the aforementioned determination and confirmation procedures of the hold state at specific time intervals (e.g., every 150, 200, or 300 milliseconds, etc.).

In addition, in the foregoing embodiments, it is determined that the handheld apparatus 100 is in the hold state only if the sides S1 and S2 of the body 140 are both being contacted. However, in some embodiments, the number or position of the first sensor 110 may differ from that in FIG. 2A and FIG. 2B. Considering that the user may hold the handheld apparatus 100 but their hand does not contact both sides S1 and S2 at the same time (e.g., when they are holding only one side of the body 140), the first sensor 110 may further be disposed on the body 140 other than on the sides S1 and S2. The processor 150 determines whether the handheld apparatus 100 is being contacted based on all or part of the sensing data of the first sensor 110. If the body 140 is being contacted, the processor 150 determines the handheld apparatus 100 is in the hold state. On the other hand, if the body 140 is not being contacted, the processor 150 determines the handheld apparatus 100 is in the un-hold state. For another example, in another embodiment, the first sensor 110 is only disposed on one side S1 or S2. Thus, when the user holds the handheld apparatus 100, as long as a contact point is detected on the side where the first sensor 110 is disposed (e.g., the total contact area or the total contact length on the side is greater than a threshold), the processor 150 determines the handheld apparatus 100 is in the hold state.

Referring back to FIG. 3, if the processor 150 determines the handheld apparatus 100 is in the hold state, the processor 150 enters a screen lock mode, and according to the presenting mode currently performed by the handheld apparatus 100, the processor 150 locks the handheld apparatus 100 to remain in this presenting mode (step S330). Specifically, the presenting mode of the screen 130 includes a portrait mode and a landscape mode. The portrait mode is exemplified by FIG. 6A in which a pattern in a frame I1 is presented upright (parallel to the X-axis). The landscape mode is exemplified by FIG. 6D in which a pattern in a frame I4 is presented horizontally (parallel to the Y axis).

In the related art, the auto-rotate screen function switches the presenting mode of the screen 130 between the portrait mode and the landscape mode according to the orientation of the body 140 of the handheld apparatus 100. To prevent the presenting mode from being improperly changed with the orientation of the body 140, the embodiment of the disclosure provides a smart rotation mode which can be enabled or disabled in setting of an operating system or an application. When the smart rotation mode has been enabled, if the handheld apparatus 100 is in the hold state, the processor 150 locks the currently performed presenting mode such that the handheld apparatus 100 remains in the locked presenting mode (i.e., in a locked state).

Figure 6A:
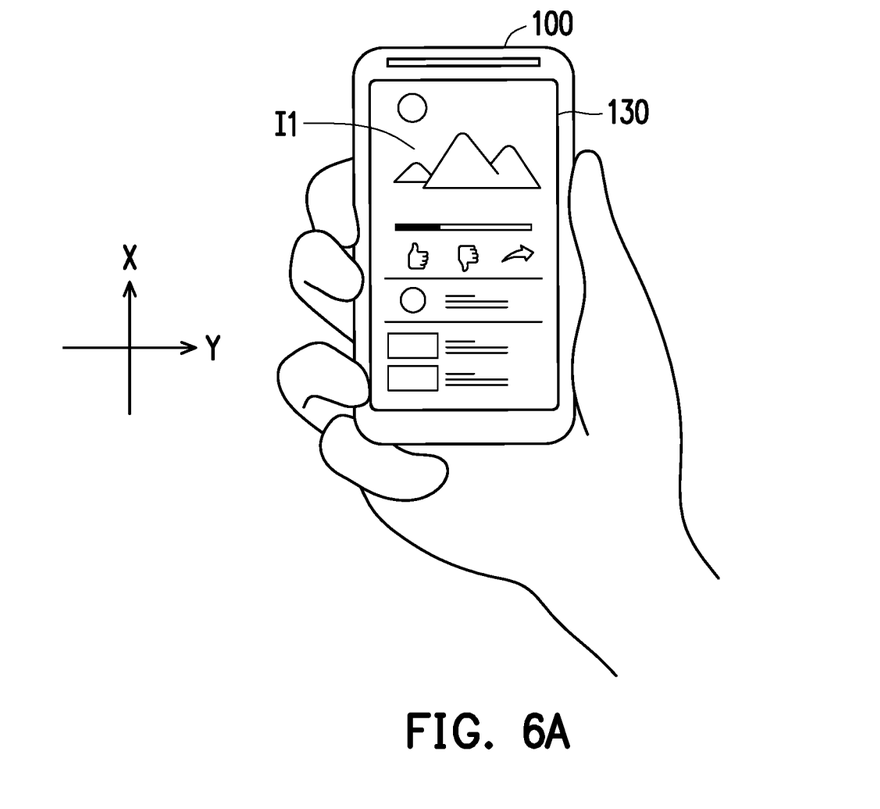
FIG. 6A to FIG. 6D are exemplary examples illustrating the presenting mode.
Figure 6B:
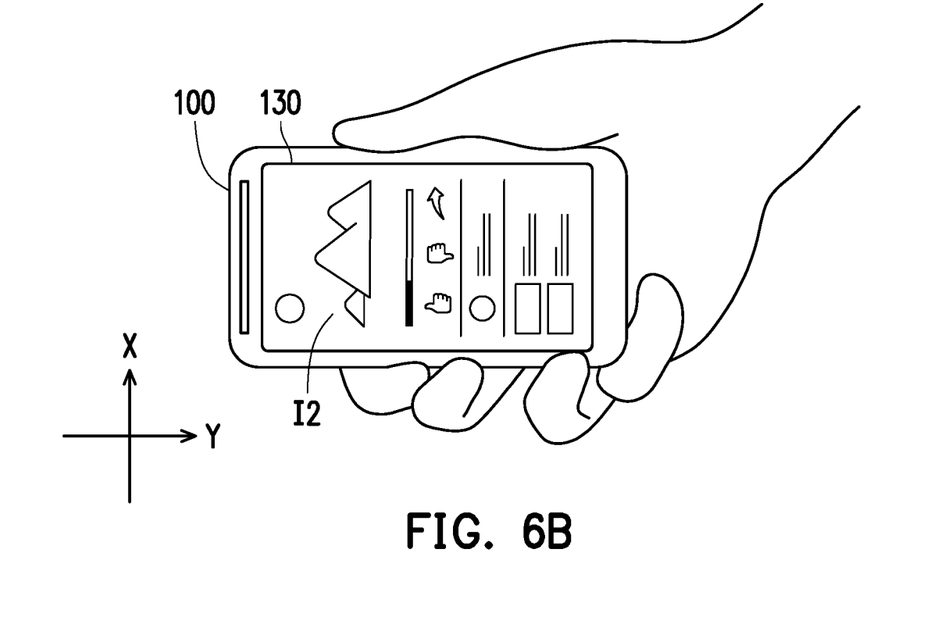
Figure 6C:
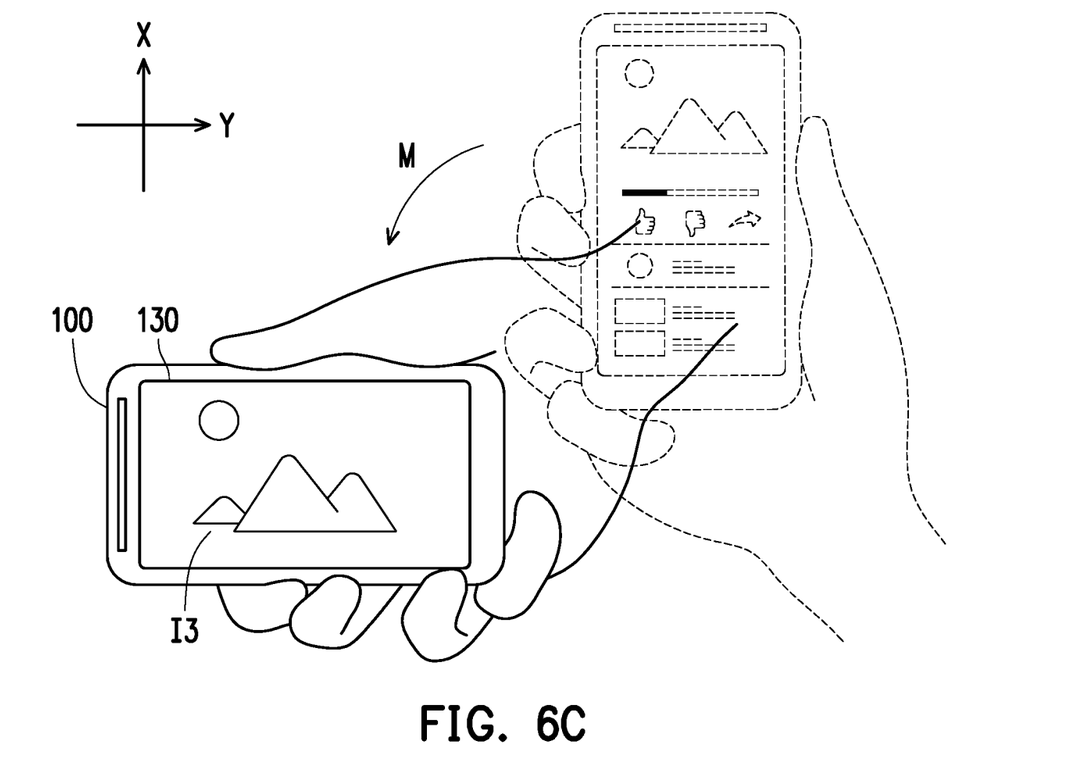
Figure 6D:
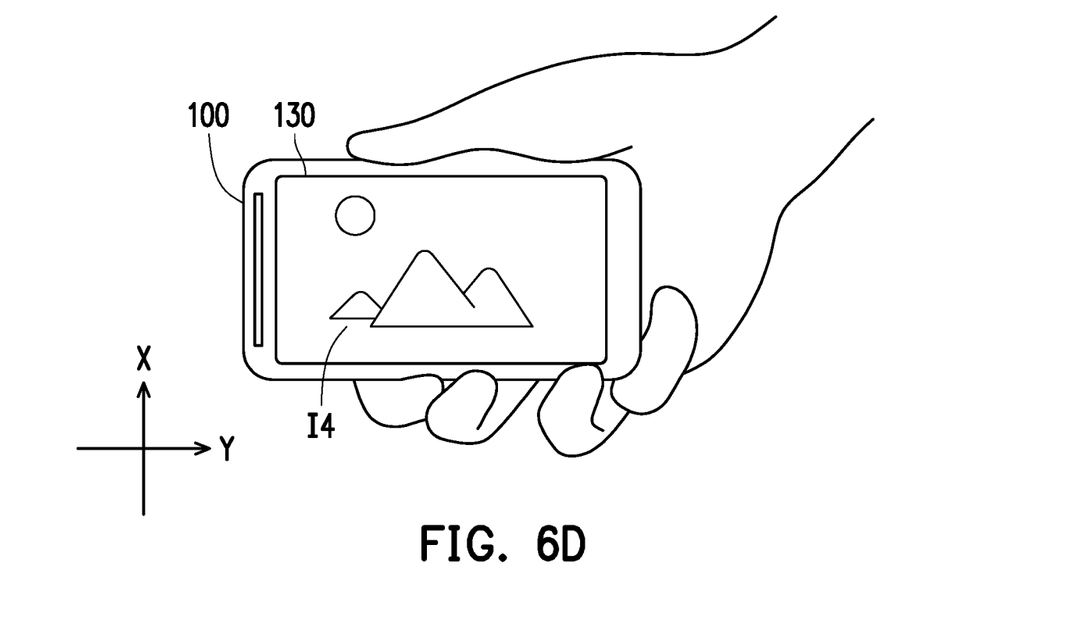

Specifically, in the state in which the auto-rotate screen function is enabled, if the presenting mode is the portrait mode (as shown in FIG. 6A), but the orientation of the handheld apparatus 100 is subsequently changed to horizontal, the processor 150 switches the presenting mode to the landscape mode (as shown in FIG. 6D); alternatively, if the presenting mode is the landscape mode (as shown in FIG. 6D), but the orientation of the handheld apparatus 100 is changed to upright, the processor 150 switches the presenting mode to the portrait mode (as shown in FIG. 6A).

If the processor 150 determines the handheld apparatus 100 is in the hold state after step S310, the processor 150 locks the presenting mode of the screen 130, instead of switching the presenting mode according to the auto-rotate screen function (e.g., by not activating or by disabling the auto-rotate screen function). That is, in the hold state, the presenting mode of the screen 130 is not changed even the orientation detected by the second sensor 120 is changed. For example, referring first to FIG. 6A, in the case where the processor 150 determines the handheld apparatus 100 is in the hold state and the currently performed presenting mode of the screen 130 is the portrait mode (as shown in FIG. 6A), the processor 150 locks the presenting mode. Thus, even if the orientation of the handheld apparatus 100 is changed to horizontal (as shown in FIG. 6B), the processor 150 still controls a frame I2 of the screen 130 to be presented upright (i.e., the presenting mode remains the portrait mode instead of switching to the landscape mode). Accordingly, if the processor 150 determines the handheld apparatus 100 is in the hold state and the currently performed presenting mode is the landscape mode (as shown in FIG. 6D), while the handheld apparatus 100 remains in the hold state, even if the orientation of the handheld apparatus 100 is subsequently changed to upright (parallel to the X-axis) because of rotation, the frame I2 of the screen 130 remains in the landscape mode instead of switching to the portrait mode. Accordingly, even if the user holding the handheld apparatus 100 changes posture from sitting to lying, the presenting mode of the screen 130 remains unchanged, and the user's operation or the frame currently being browsed is not affected.

To provide more diverse and convenient functions, in an embodiment, in response to the presenting mode of the screen 130 being locked, the processor 150 detects whether the orientation of the handheld apparatus 100 is in a predetermined state (e.g., swinging operation, shaking operation, etc.) so as to switch the presenting mode currently performed by the handheld apparatus 100 to another presenting mode.

Taking FIG. 6C as an example, it is assumed that the predetermined state is the swinging operation, and the orientation of the handheld apparatus 100 is upright (shown in dotted line) at first. Next, the handheld apparatus 100 is rotated along a trajectory M to move to a position as shown in solid line. The processor 150 determines whether the orientation detected by the second sensor 120 has undergone a change with a certain range (e.g., whether the acceleration or angular velocity in a certain axial direction is greater than a specific threshold, or whether a directional change exceeds a certain threshold, etc.) within a certain time range (e.g., 500 milliseconds, 1 second, etc.). If yes, the processor 150 determines the change in the orientation that corresponds to the trajectory M conforms to the swinging operation; otherwise (if the change is less than the threshold), the processor 150 determines the change does not conform to the swinging operation. If the change in the orientation conforms to the swinging operation, even if the handheld apparatus 100 is still in the hold state, the processor 150 switches the screen 130 to another presenting mode (e.g., FIG. 6C shows that the portrait mode is switched to the landscape mode), and the presenting mode is recorded as the locked presenting mode after switching.

It is to be noted that depending different design needs, the predetermined state may include one or more modes of operation, and the threshold for evaluating whether the sensing data of the second sensor 120 conforms to the predetermined state may also change depending on the mode of operation.

Referring back to FIG. 3, in the case where the processor 150 determines the handheld apparatus 100 is in the un-hold state after step S310, the processor 150 adjusts the presenting mode to the portrait mode or the landscape mode according to the auto-rotate screen function (step S370). That is, if the presenting mode of the screen 130 is one of the portrait mode and the landscape mode, but the orientation of the handheld apparatus 130 corresponds to the other of the portrait mode and the landscape mode, the processor 130 switches the presenting mode to the other. That is, the presenting mode is not locked, and the processor 130 maintains the auto-rotate screen function such that the presenting mode of the screen 130 can be switched according to the orientation. The orientation detected by the second sensor 120 drives the screen 130 to change the presenting mode. The auto-rotate screen function has been explained in the foregoing embodiments (e.g., in FIGS. 6A and 6D), and will not be repeated herein. In addition, the processor 150 continuously determines whether the handheld apparatus 100 is in the hold state. If the handheld apparatus 100 is initially in the hold state and then determined to be in the un-hold state, the processor 150 operates according to step S370.

It is worth noting that, since the smart rotation mode can be disabled in the setting of the operating system or the application, if the processor 150 determines in step S310 that the handheld apparatus 100 is in the hold state, the processor 150 confirms whether the smart rotation mode is enabled. If the smart rotation mode has been enabled, the processor 150 performs the operation of step S330. If the smart rotation mode has not been enabled (or has been disabled), the processor 150 maintains the auto-rotate screen function (i.e., the presenting mode of the screen 130 is not locked).

In addition, to provide a better user experience, in addition to locking the presenting mode of the handheld apparatus 100 in accordance with the hold state, in an embodiment, if the handheld apparatus 100 remains in the hold state, the processor 150 may determine to maintain the screen 130 on without entering a sleep state.

In addition, the disclosure further provides a non-transitory computer-readable recording medium (e.g., a storage medium such as a hard disk, a compact disk, a flash memory, or a solid state disk (SSD)). The computer-readable recording medium is capable of storing a plurality of code segments (e.g., code segments of storage space detection, code segments of spatial adjustment option presentation, code segments of maintenance work, and code segments of frame presentation, etc.). After the code segments are loaded onto the processor 150 of the handheld apparatus 100 and executed, all the steps of the above control method of the presenting mode can be completed.

In summary, in the handheld apparatus, the control method thereof of the presenting mode and the non-transitory computer-readable recording medium of the embodiment of the disclosure, whether the handheld apparatus is in the hold state is determined by the sensor disposed on the handheld apparatus. Next, in the hold state, the auto-rotate screen function is disabled, such that the presenting mode (i.e., upright/landscape mode) of the screen is maintained/locked/fixed. Even if the orientation of the handheld apparatus is changed, the presenting mode remains unchanged. On the other hand, when the handheld apparatus is in the un-hold state, the auto-rotate screen function is maintained such that the presenting mode is changed with the orientation of the handheld apparatus. That is, the embodiment of the disclosure provides a function of locking the presenting mode according to the hold state, so that the user is offered more diverse and convenient operations which satisfy actual use conditions.

Although the disclosure has been described with reference to the above examples, it will be apparent to one of ordinary skill in the art that modifications to the described examples may be made without departing from the spirit of the disclosure. Accordingly, the scope of the disclosure will be defined by the attached claims and not by the above detailed descriptions.

What is claimed is:

1. A control method of a presenting mode, adapted for a handheld apparatus comprising a screen and at least one sensor disposed on two opposite sides of the handheld apparatus, the handheld apparatus having an auto-rotate screen function of automatically adjusting the presenting mode of the screen to a portrait mode or a landscape mode according to an orientation of the handheld apparatus, wherein the control method comprises:
   determining whether a total contact area or a total contact length of the handheld apparatus on at least one of the sides is greater than a first threshold and both sides of the handheld apparatus are being contacted according to sensing data of the at least one sensor of the handheld apparatus;
   in response to determining the total contact area or the total contact length of the handheld apparatus on the at least one of the sides is greater than the first threshold and the both sides of the handheld apparatus are being contacted, determining that the handheld apparatus is in a hold state;
   in response to determining the total contact area or the total contact length of the handheld apparatus on each of the both sides is less than or equal to the first threshold or the at least one of the sides of the handheld apparatus is not being contacted, determining that the handheld apparatus is in an un-hold state;
   in response to determining that the handheld apparatus is in the hold state, locking the handheld apparatus to remain in the presenting mode according to the presenting mode currently performed by the handheld apparatus without adjusting the presenting mode according to the auto-rotate screen function;
   in response to determining that the handheld apparatus is in the un-hold state, adjusting the presenting mode of the screen according to the auto-rotation screen function; and
   after determining that the handheld apparatus is in the hold state, determining that the handheld apparatus is in the un-hold state in response to the total contact area or the total contact length on the at least one of the sides is less than a second threshold, wherein the first threshold is greater than the second threshold.

2. The control method of the presenting mode according to claim 1, further comprising:
   in response to determining that the handheld apparatus is not in the hold state, adjusting the presenting mode to the portrait mode or the landscape mode according to the auto-rotate screen function.

3. The control method of the presenting mode according to claim 1, further comprising:

in response to determining that the handheld apparatus is in the hold state, not activating the auto-rotate screen function.

4. The control method of the presenting mode according to claim 1, further comprising:
in response to the presenting mode of the handheld apparatus being locked, detecting whether the orientation of the handheld apparatus is in a predetermined state corresponding to a swinging operation or a shaking operation, to switch the presenting mode currently performed by the handheld apparatus to another presenting mode.

5. A handheld apparatus comprising:
at least one first sensor, disposed on two opposite sides of a body of the handheld apparatus;
a second sensor, sensing an orientation of the body;
a screen, wherein the handheld apparatus has an auto-rotate screen function of automatically adjusting a presenting mode of the screen to a portrait mode or a landscape mode according to the orientation of the body; and
a processor, coupled to the at least one first sensor, the second sensor, and the screen, the processor being configured to:
determine whether a total contact area or a total contact length of the body on at least one of the sides is greater than a first threshold and both sides of the handheld apparatus are being contacted according to sensing data of the at least one first sensor;
in response to determining the total contact area or the total contact length of the handheld apparatus on the at least one of the sides is greater than the first threshold and the both sides of the handheld apparatus are being contacted, determine that the handheld apparatus is in a hold state;
in response to determining the total contact area or the total contact length of the handheld apparatus on each of the both sides is less than or equal to the first threshold or the at least one of the sides of the handheld apparatus is not being contacted, determine that the handheld apparatus is in an un-hold state;
in response to determining that the handheld apparatus is in the hold state, lock the handheld apparatus to remain in the presenting mode according to the presenting mode currently performed by the handheld apparatus without adjusting the presenting mode according to the auto-rotate screen function;
in response to determining that the handheld apparatus is in the un-hold state, adjust the presenting mode of the screen according to the auto-rotation screen function; and
after determining that the handheld apparatus is in the hold state, determine that the handheld apparatus is in the un-hold state in response to the total contact area or the total contact length on the at least one of the sides is less than a second threshold, wherein the first threshold is greater than the second threshold.

6. The handheld apparatus according to claim 5, wherein the processor is configured to:
determine the handheld apparatus is not in the hold state, and adjust the presenting mode to the portrait mode or the landscape mode according to the auto-rotate screen function.

7. The handheld apparatus according to claim 5, wherein the processor is configured to:

in response to determining that the handheld apparatus is in the hold state, not activate the auto-rotate screen function.

8. The handheld apparatus according to claim 5, wherein the processor is configured to:
in response to the presenting mode of the handheld apparatus being locked, detect whether the orientation of the handheld apparatus is in a predetermined state corresponding to a swinging operation or a shaking operation, to switch the presenting mode currently performed by the handheld apparatus to another presenting mode.

9. The handheld apparatus according to claim 5, wherein the at least one first sensor comprises at least one of a capacitive sensor, a resistive sensor, a piezoelectric sensor, an electromagnetic sensor, an ultrasonic sensor, an infrared sensor, an optical sensor and a pressure sensor.

10. The handheld apparatus according to claim 5, wherein the second sensor comprises at least one of a G-sensor, a magnetic sensor and an accelerator.

11. A non-transitory computer-readable recording medium recording a code, the code being loaded onto a processor of a handheld apparatus comprising a screen to perform:
determining whether a total contact area or a total contact length of the handheld apparatus on at least one of two opposite sides is greater than a first threshold and both sides of the handheld apparatus are being contacted according to sensing data of at least one sensor disposed on the handheld apparatus, wherein at least one sensor disposed on two opposite sides of the handheld apparatus, wherein the handheld apparatus has an auto-rotate screen function of automatically adjusting a presenting mode of the screen to a portrait mode or a landscape mode according to an orientation of the handheld apparatus;
in response to determining the total contact area or the total contact length of the handheld apparatus on the at least one of the sides is greater than the first threshold and the both sides of the handheld apparatus are being contacted, determining that the handheld apparatus is in a hold state;
in response to determining the total contact area or the total contact length of the handheld apparatus on each of the both sides is less than or equal to the first threshold or the at least one of the sides of the handheld apparatus is not being contacted, determining that the handheld apparatus is in an un-hold state;
in response to determining that the handheld apparatus is in the hold state, locking the handheld apparatus to remain in the presenting mode according to the presenting mode currently performed by the handheld apparatus without adjusting the presenting mode according to the auto-rotate screen function;
in response to determining that the handheld apparatus is in the un-hold state, adjusting the presenting mode of the screen according to the auto-rotation screen function; and
after determining that the handheld apparatus is in the hold state, determining that the handheld apparatus is in the un-hold state in response to the total contact area or the total contact length on the at least one of the sides is less than a second threshold, wherein the first threshold is greater than the second threshold.

* * * * *